Sept. 2, 1952     J. E. BYWATER ET AL     2,608,924
THREE-POINT FRONT IMPLEMENT MOUNTING FOR TRACTORS
Filed March 25, 1950

J.E. BYWATER
R.F. HALE
INVENTOR.

BY E. C. McRae
J. R. Faulkner
D. H. Oster

ATTORNEYS

Patented Sept. 2, 1952

2,608,924

UNITED STATES PATENT OFFICE 2,608,924

THREE-POINT FRONT IMPLEMENT MOUNTING FOR TRACTORS

James Edward Bywater, Whitnash, near Leamington Spa, and Ronald Frederick Hale, Seven Kings, England, assignors to Ford Motor Company, Dearborn, Mich., a corporation of Delaware Application March 25, 1950, Serial No. 151,894
In Great Britain January 24, 1949

1 Claim. (Cl. 97—47)

This invention relates generally to tractors and has particular reference to a tractor adapted to support implements at its forward end.

An object of the present invention is to provide a tractor having an improved form of mounting which is economical to manufacture, easy to install upon the tractor, and which provides a completely stable mounting while permitting controlled vertical movement of the links employed. The mounting includes a triangular upper link pivotally mounted upon the forward end of the tractor and connected to hydraulic power means carried upon the tractor to vary the vertical position of the link and the implement carried thereby. Two lower links are arranged upon each side of the tractor, being pivotally connected to the tractor and to the implement.

Other objects and advantages of the invention will be made more apparent as this description proceeds, particularly when considered in connection with the accompanying drawings, in which.

Figure 1:
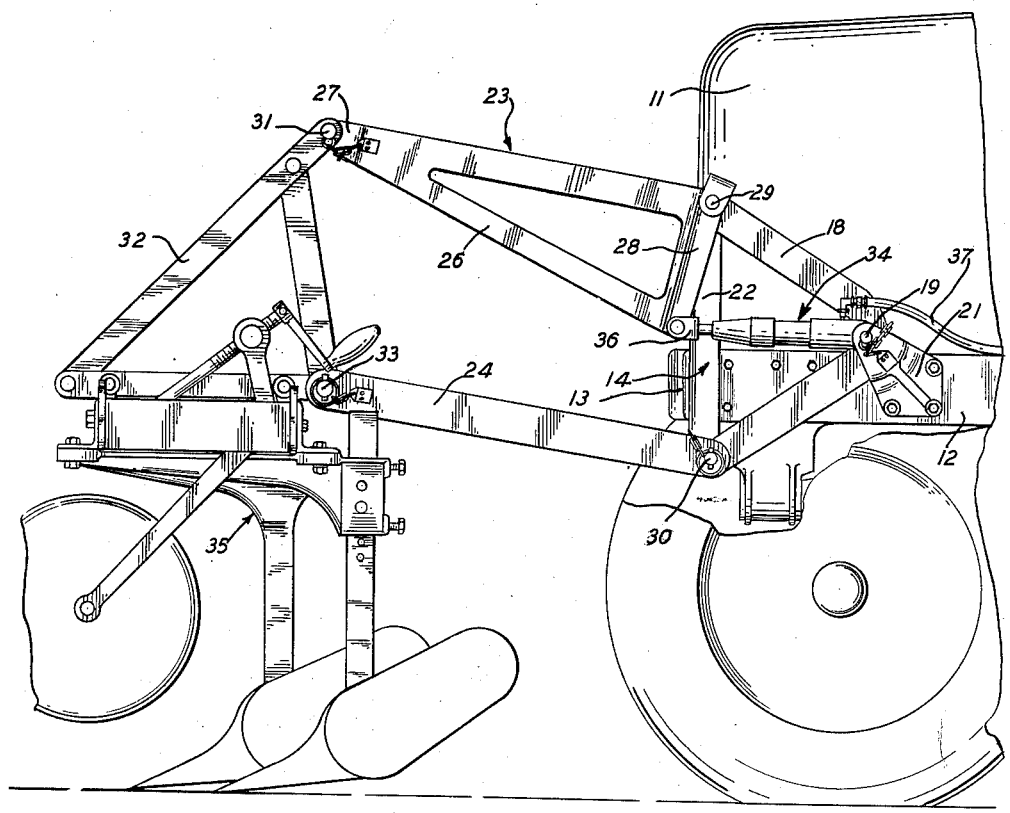
Figure 1 is a fragmentary side elevational view of the forward portion of a tractor incorporating the construction of the present invention.
Figure 2:
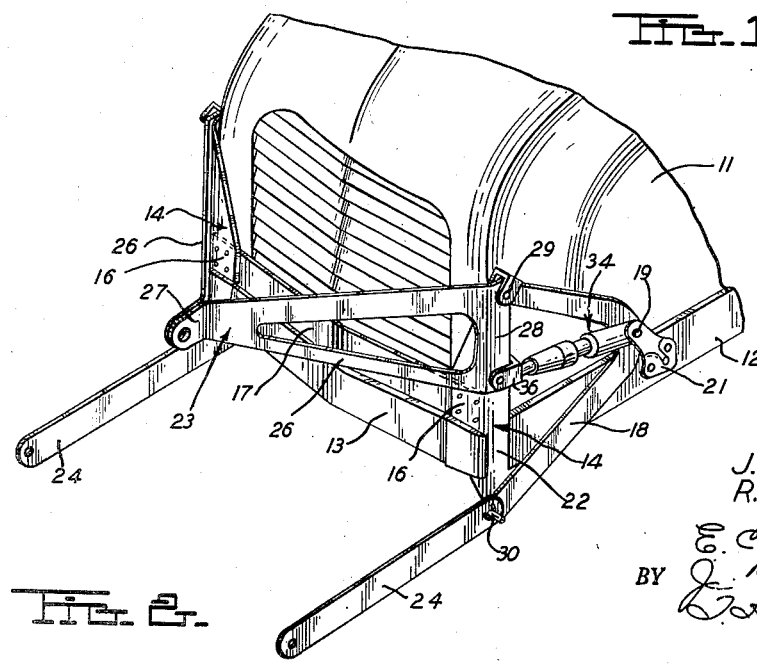
Figure 2 is a fragmentary perspective view of the construction shown in Figure 1, showing the linkage with the implement removed.

Referring now to the drawing, the reference character 11 indicates the forward portion of a tractor having side rails 12 and a ledge 13 across the forward portion thereof. A pair of vertically extending brackets 14 are positioned at the opposite front corners of the tractor. Each bracket 14 is L-shaped in horizontal cross section with its forward flange 16 resting upon the ledge 13 of the tractor and connected to the forward flange of the opposite bracket by means of a cross member 17.

A U-shaped yoke 18 is located at each side of the tractor and its rearward end portion is connected by means of a pin 19 to a bracket 21 bolted to the side rail 12 of the tractor. The forward free ends of the yoke 18 are connected to the upper and lower extremities of the side flanges 22 of the brackets 14. It will be seen that the vertical brackets 14, interconnected by the cross member 17 and braced by the yokes 18, afford both vertical and lateral stability to the mounting. If desired, the brackets 14 and cross member 17 can be secured to the tractor by suitable fastening means or by welding.

Front mounted implements are adapted to be supported upon the described mounting by means of an upper triangular link assembly 23 and laterally spaced lower links 24. The upper triangular link assembly is formed of a pair of link members 26 having forward flanges 27 arranged in juxtaposition and suitably secured together. Each of the side link members 26 is generally triangular in configuration and has a rearward base flange 28, the upper portion of which is pivotally connected to the upper end of the adjacent bracket 14 by means of a pivot pin 29. The lower links 24 are pivoted to the lower ends of the brackets 14 by pivot pins 30.

As best seen in Figure 1, the upper triangular link assembly 23 is adapted to be pivotally connected at its forward end by means of a pin 31 to the upper portion of an A-frame 32 carried by the implement 35, in this instance a potato coverer. Similarly, the forward end of the lower links 24 are connected by pivot pins 33 to the A-frame.

The upper triangular link assembly 23, and the implement carried thereby, are adapted to be raised and lowered vertically by means of a cylinder and piston assembly 34 pivotally connected at its rearward end to the bracket 21 by means of the pin 19. A clevis 36 at the forward end of the cylinder and piston assembly 34 is pivotally connected to the lower portion of the base 28 of the triangular side link member 26. A cylinder and piston assembly is provided at each side of the tractor so that uniform power will be applied to each of the side link members 26.

Hydraulic power for actuating the cylinder and piston assembly 34 is supplied through a conduit 37 extending rearwardly of the tractor along the side rails 12 and connected to the hydraulic power lift mechanism (not shown) conventionally provided upon agricultural tractors. With this arrangement, the control mechanism conventionally provided to control the hydraulic lifting of rear mounted implements can also be used to control the vertical position of front mounted implements.

If the brackets 14 and cross members 17 are not permanently connected to the tractor, the entire front mounting assembly, with the exception of the side brackets 21, can be removed as a unit from the tractor simply by removing the pins 19. In the event the removal of the entire assembly is not desired, the lower links 24 may be readily removed from the pins 30.

It will be understood that the invention is not to be limited to the exact construction shown and described, but that various changes and modifications may be made without departing from the spirit and scope of the invention, as defined in the appended claim.

What is claimed is:

A three point front implement mounting for a tractor having frame side rails and a frame cross member at the front thereof, vertical corner brackets at the junction of each side rail with said cross member and secured thereto, a transverse reinforcing member interconnecting said vertical corner brackets and supported upon said front frame cross member, a supporting bracket mounted upon each side rail rearwardly of said vertical brackets, a forwardly facing U-shaped yoke at each side of said tractor, a pair of laterally spaced lower links extending forwardly from said tractor and having means at their forward ends for connection to an implement, pivot pins detachably inter-connecting the rear ends of said lower links with the lower ends of said corner brackets and the forward extremities of the lower legs of said U-shaped yokes, an upper link assembly extending forwardly from said tractor and having means at its forward end forming a single point connection for an implement substantially on the longitudinal center line of the tractor, said upper link assembly having triangularly shaped side portions extending rearwardly from said single point connection in diverging relationship to each other, pivot pins detachably interconnecting the upper rear corners of said triangularly shaped side portions to the upper ends of said corner brackets and the forward extremities of the upper legs of said U-shaped yokes, horizontally disposed cylinder and piston assemblies at each side of said tractor having their forward ends pivotally connected to the lower rear corners of said triangularly shaped side portions of said upper link assembly, and pivot pins detachably interconnecting the rearward ends of said cylinder and piston assemblies to said supporting brackets and the bases of said U-shaped yokes.

JAMES EDWARD BYWATER.
RONALD FREDERICK HALE.

REFERENCES CITED

The following references are of record in the file of this patent:

UNITED STATES PATENTS

| Number | Name | Date |
| --- | --- | --- |
| 2,054,513 | Kriegbaum et al. | Sept. 15, 1936 |
| 2,305,254 | Hirschkorn | Dec. 15, 1942 |
| 2,444,321 | Woolridge | June 29, 1948 |
| 2,445,145 | Love | July 13, 1948 |
| 2,565,337 | Allan | Aug. 21, 1951 |

FOREIGN PATENTS

| Number | Country | Date |
| --- | --- | --- |
| 587,243 | Great Britain | Apr. 18, 1947 |